United States Patent
Baldemair et al.

(10) Patent No.: US 12,126,561 B2
(45) Date of Patent: Oct. 22, 2024

(54) SIMULTANEOUS TRANSMISSION OF PUSCH AND PUCCH

(71) Applicant: Telefonaktiebolaget LM Ericsson (publ), Stockholm (SE)

(72) Inventors: Robert Baldemair, Solna (SE); Erik Dahlman, Stockholm (SE); Sorour Falahati, Stockholm (SE); Stefan Parkvall, Bromma (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

(21) Appl. No.: 16/463,927

(22) PCT Filed: Dec. 22, 2016

(86) PCT No.: PCT/SE2016/051309
§ 371 (c)(1),
(2) Date: May 24, 2019

(87) PCT Pub. No.: WO2018/117921
PCT Pub. Date: Jun. 28, 2018

(65) Prior Publication Data
US 2019/0319766 A1  Oct. 17, 2019

(51) Int. Cl.
*H04L 5/00* (2006.01)
*H04L 5/14* (2006.01)
(Continued)

(52) U.S. Cl.
CPC .......... *H04L 5/0053* (2013.01); *H04L 5/0048* (2013.01); *H04L 5/1469* (2013.01); *H04W 72/21* (2023.01); *H04W 72/23* (2023.01)

(58) Field of Classification Search
CPC ... H04L 5/0053; H04L 5/0048; H04L 5/1469; H04W 72/1284; H04W 72/1289;
(Continued)

(56) References Cited

U.S. PATENT DOCUMENTS

| | | | |
|---|---|---|---|
| 2009/0168714 A1* | 7/2009 | Tanaka | H04L 1/1893 370/329 |
| 2010/0008317 A1* | 1/2010 | Bhattad | H04L 1/0003 370/329 |

(Continued)

FOREIGN PATENT DOCUMENTS

| | | |
|---|---|---|
| CN | 102075951 A | 5/2011 |
| CN | 104823389 A | 8/2015 |

(Continued)

OTHER PUBLICATIONS

"PUCCH and UCI for MTC and coverage enhancement", Huawei, HiSilicon, 3GPP TSG RAN WG 1 Meeting #80bis, R1-151267, Belgrade, Serbia, Apr. 20-24, 2015, pp. 1-5.
(Continued)

*Primary Examiner* — Un C Cho
*Assistant Examiner* — Lalita W Pace
(74) *Attorney, Agent, or Firm* — Weisberg I.P. Law, P.A.

(57) ABSTRACT

This disclosure pertains to a method for operating a user equipment (10), UE, in a radio access network. The method comprises transmitting signaling on a Physical Uplink Control CHannel, PUCCH, resource structure and on a Physical Uplink Shared Channel, PUSCH, resource structure. The PUCCH resource structure covers a PUCCH time interval and a PUCCH frequency interval, and the PUSCH resource structure covers a PUSCH time interval and a PUSCH frequency interval. The PUSCH time interval is longer than the PUCCH time interval. Further, the PUCCH resource structure is neighbored in frequency domain by the PUSCH resource structure at least for a part of the PUCCH time interval and the PUCCH resource structure is neighbored in time domain by a further PUCCH resource structure or the PUSCH resource structure. The disclosure also pertains to related devices and methods.

20 Claims, 12 Drawing Sheets

(51) Int. Cl.
*H04W 72/21* (2023.01)
*H04W 72/23* (2023.01)

(58) Field of Classification Search
CPC ......... H04W 72/0446; H04W 72/0453; H04W 72/23; H04W 72/21; H04B 7/2643; H04B 7/2656
See application file for complete search history.

(56) References Cited

U.S. PATENT DOCUMENTS

| | | | |
|---|---|---|---|
| 2014/0036889 A1 | 2/2014 | Kim et al. | |
| 2014/0177458 A1* | 6/2014 | Novak | H04W 72/085 370/252 |
| 2014/0293947 A1* | 10/2014 | Nishikawa | H04W 72/1257 370/329 |
| 2014/0329555 A1* | 11/2014 | Gao | H04W 52/367 455/522 |
| 2015/0319796 A1 | 11/2015 | Lu et al. | |
| 2015/0365218 A1* | 12/2015 | Yang | H04L 5/0051 370/329 |
| 2016/0095069 A1* | 3/2016 | Noh | H04L 1/1671 455/452.1 |
| 2016/0182199 A1 | 6/2016 | Webb et al. | |
| 2016/0286558 A1 | 9/2016 | Chae et al. | |
| 2016/0338124 A1* | 11/2016 | Byun | H04L 5/0094 |
| 2017/0238304 A1* | 8/2017 | Ling | H04L 5/0037 370/336 |
| 2017/0366380 A1* | 12/2017 | Hwang | H04L 1/1861 |
| 2018/0124755 A1* | 5/2018 | Huang | H04W 72/0413 |
| 2018/0132229 A1* | 5/2018 | Li | H04W 72/0413 |
| 2018/0212718 A1* | 7/2018 | Takeda | H04W 72/0413 |
| 2018/0302900 A1* | 10/2018 | Ibars Casas | H04W 72/042 |
| 2018/0317256 A1* | 11/2018 | Um | H04W 74/0808 |
| 2018/0359057 A1* | 12/2018 | Yang | H04L 5/00 |
| 2018/0376499 A1* | 12/2018 | Fu | H04L 5/0092 |
| 2019/0261341 A1* | 8/2019 | Tang | H04W 72/0413 |

FOREIGN PATENT DOCUMENTS

| | | |
|---|---|---|
| CN | 105027648 A | 11/2015 |
| CN | 105637793 A | 6/2016 |
| WO | 2016186554 A1 | 11/2016 |

OTHER PUBLICATIONS

"PUCCH Consideration for MTC", Nokia Networks, 3GPP TSG-RAN WG1 Meeting #80bis, R1-151310, Belgrade, Serbia, Apr. 20-24, 2015, pp. 1-4.
"UL channelization in long UL duration", 3GPP TSG-RAN WG1 #87; R1-1612074; Reno, U.S.A, Nov. 14-18, 2016, pp. 1-5.
"UL control channel for Nr", 3GPP TSG RAN WG1 Meeting #87; R1-1612718; Reno, USA, Nov. 14-18, 2016, pp. 1-9.
"Multiplexing of PUCCH and other channels", 3GPP TSG RAN WG1 Meeting #87, R1-1612140, Reno, USA, Nov. 14-18, 2016, pp. 1-5.
"On simultaneous PUSCH and PUCCH and clustered SC-FDMA", 3GPP TSG RAN WG1 Meeting #60bis, R1-101876, Beijing, P.R. China,, Apr. 12-16, 2010, pp. 1-6.
"Summary of e-mail discussions on uplink control signaling", TSG-RAN WG1 #87, R1-1612916, Reno, NV, USA, Nov. 14-18, 2016, pp. 1-22.
EPO Communication dated Jul. 20, 2022 for Patent Application No. 16829329.8, consisting of 6-pages.

* cited by examiner

SIMULTANEOUS TRANSMISSION OF PUSCH AND PUCCH

TECHNICAL FIELD

This disclosure pertains to wireless communication technology, in particular to uplink transmission.

BACKGROUND

For NR it has been agreed to support simultaneous transmission of PUSCH and PUCCH (such a mode has also been introduced for LTE Rel-10), as shown in FIG. 1. Simultaneous transmission of PUSCH and PUCCH is conceptual simple, since it neither modifies the PUSCH nor the PUCCH structure, as both channels are just sent in parallel.

Normally PUCCH occurs at semi-static configured resources (potentially indicated together with some dynamic indication included in DCI). The semi-statically configured resources are typically ("common setup") placed at the band edges, and PUCCH frequency-hops between them to achieve frequency diversity.

PUSCH transmissions are typically dynamically scheduled. It is therefore quite common that PUCCH and PUSCH transmission could happen at disjoint frequencies, with a gap between them depending on the location and bandwidth of PUSCH and PUCCH resource structures.

One of the drawbacks of this design may occur if PUSCH and PUCCH frequency allocations are far apart, especially if combined with high power transmission. In this case, intermodulation products occur due to non-linearities in transmitters, e.g. an associated power amplifier (every UE power amplifier is a non-linear device). Odd order intermodulation products (especially $3^{rd}$ and $5^{th}$ order) may lead to spectrum re-growth far apart of the modulated spectrum in the out-of-band region. To counter this effect, large power backoff may be necessary to be applied, such that the design of FIG. 1 may lead to undesirable transmission power scenarios.

Therefore, it has been proposed to move PUCCH close to the scheduled PUSCH resource, as shown in FIG. 2. A terminal is scheduled with PUSCH resources and if it determines it also needs to transmit simultaneously on PUCCH, it moves its PUCCH resource structure adjacent to the scheduled PUSCH structure (the dashed PUCCH resource structure is not used by the terminal and indicates the resource structure before moving).

By moving the PUCCH resource structure/s adjacent to the PUSCH resource structure, no frequency gap occurs between the resource structures of PUSCH and PUCCH, and intermodulation products are less of a concern. Power backoff is less needed.

However, as can be seen in FIG. 2, a drawback of this solution is related to the resources marked by "???". Scheduling assignments often assign a resource structure in form of a rectangle in time-frequency plane spanning the scheduled bandwidth times a slot duration, which often is in the form of a resource block. In FIG. 2, where PUCCH has been moved from the PUCCH region (which typically is reserved for PUCCH) into the PUSCH region used for dynamic scheduling—it is not possible to address the "???" marked resources, since the resource allocation in frequency does not change within the slot (using a regular scheduling command). One alternative is not to schedule frequencies overlapping with the "???" marked region, but this is inefficient, especially if one considers that situation of FIG. 2 may occur several times within a slot—once for every UE sending PUSCH and PUCCH simultaneously.

SUMMARY

It is an object of this disclosure to indicate approaches alleviating the above-mentioned issue.

Accordingly, there is described a method for operating a user equipment (UE) in a radio access network. The method comprises transmitting signaling on a Physical Uplink Control CHannel, PUCCH, resource structure and on a Physical Uplink Shared Channel, PUSCH, resource structure. The PUCCH resource structure covers a PUCCH time interval and a PUCCH frequency interval, and the PUSCH resource structure covers a PUSCH time interval and a PUSCH frequency interval. The PUCCH resource structure is neighbored in frequency domain by the PUSCH resource structure at least for a part of the PUCCH time interval. Moreover, the PUCCH resource structure is neighbored in time domain by a further PUCCH resource structure or the PUSCH resource structure.

There is also disclosed a user equipment for a radio access network. The user equipment is adapted for transmitting signaling on a Physical Uplink Control CHannel, PUCCH, resource structure and on a Physical Uplink Shared Channel, PUSCH, resource structure. The PUCCH resource structure covers a PUCCH time interval and a PUCCH frequency interval, and the PUSCH resource structure covers a PUSCH time interval and a PUSCH frequency interval. The PUCCH resource structure is neighbored in frequency domain by the PUSCH resource structure at least for a part of the PUCCH time interval. Moreover, the PUCCH resource structure is neighbored in time domain by a further PUCCH resource structure or the PUSCH resource structure. It may be considered that the user equipment comprises processing circuitry and/or radio circuitry, in particular a transmitter or transceiver (operating as a transmitter, and representing one example of a transmitter). The user equipment may be adapted to use the processing circuitry and/or the transmitter for transmitting signaling as described herein. Alternatively or additionally, the user equipment may comprise a transmitting module for such transmitting, which may in some variants be implemented in processing circuitry.

Transmitting signaling may generally be based on a determination that PUCCH and PUSCH should be transmitted simultaneously. The user equipment may perform such determination, and/or be adapted for such determination, and/or be adapted for using processing circuitry for such determination. Alternatively or additionally, the UE may comprise a determining module for performing such a determination. The determination may be based on scheduling information, e.g. dynamic and/or semi-static scheduling information, indicating when or that PUCCH signaling and/or PUSCH signaling is to be transmitted. Such scheduling information may be received from a network node, e.g. a network node as described herein. Transmitting signaling may comprise, and/or be based on, receiving such scheduling information. The UE may perform such receiving, and/or be adapted for such receiving, and/or be adapted for using processing circuitry and/or radio circuitry, in particular a receiver (which may be a transceiver used as receiver), for such receiving. Alternatively or additionally, the UE may comprise a receiving module for such receiving. Transmitting signaling may comprise modulating and/or encoding of data (e.g., for signaling PUSCH) and/or control information (e.g., for signaling PUCCH), and/or mapping or associating signals and/or symbols to the corresponding resource structure, e.g. for PUCCH to the PUCCH resource structure, and for PUSCH to the PUSCH resource structure.

In addition, there is disclosed a method for operating a network node in a radio access network. The network node being adapted for receiving signaling on a Physical Uplink Control CHannel, PUCCH, resource structure and on a Physical Uplink Shared Channel, PUSCH, resource structure. The PUCCH resource structure covers a PUCCH time interval and a PUCCH frequency interval, and the PUSCH resource structure covers a PUSCH time interval and a PUSCH frequency interval. The PUCCH resource structure is neighbored in frequency domain by the PUSCH resource structure at least for a part of the PUCCH time interval. Moreover, the PUCCH resource structure is neighbored in time domain by a further PUCCH resource structure or the PUSCH resource structure.

A network node for a radio access network may be considered. The network node is adapted for receiving signaling on a Physical Uplink Control CHannel, PUCCH, resource structure and on a Physical Uplink Shared Channel, PUSCH, resource structure. The PUCCH resource structure covers a PUCCH time interval and a PUCCH frequency interval, and the PUSCH resource structure covers a PUSCH time interval and a PUSCH frequency interval. The PUCCH resource structure is neighbored in frequency domain by the PUSCH resource structure at least for a part of the PUCCH time interval. Moreover, the PUCCH resource structure is neighbored in time domain by a further PUCCH resource structure or the PUSCH resource structure. It may be considered that the network node comprises processing circuitry and/or radio circuitry, in particular a receiver or transceiver (operating as a receiver and representing one example of a receiver). The network node may be adapted to use the processing circuitry and/or the receiver for receiving signaling as described herein. Alternatively or additionally, the network node may comprise a receiving module for such receiving, which may in some variants be implemented in processing circuitry.

Receiving signaling may generally be based on a determination that PUCCH and PUSCH should be received simultaneously. The network node may perform such determination, and/or be adapted for such determination, and/or be adapted for using processing circuitry for such determination. Alternatively or additionally, the network node may comprise a determining module for performing such a determination. The determination may be based on scheduling information, e.g. dynamic and/or semi-static scheduling information, indicating when or that PUCCH signaling and/or PUSCH signaling is to be transmitted or received.

Receiving signaling may comprise, and/or be based on, transmitting such scheduling information to the UE. The network node may perform such transmitting, and/or be adapted for such transmitting, and/or be adapted for using processing circuitry and/or radio circuitry, in particular a transmitter, for such transmitting. Alternatively or additionally, the UE may comprise a transmitting module for such transmitting. Receiving signaling may comprise associating and/or mapping signals and/or symbols and/or signaling received in a specific resource structure to the associated channel, e.g. signaling received on the PUCCH resource structure to the PUCCH, and signaling received on the PUSCH resource structure to the PUSCH. It may be considered that receiving comprises decoding and/or demodulating.

These approaches facilitate efficient and predictable use of scheduled (uplink) resources, without requiring additional control signaling.

The PUSCH resource structure and the PUCCH resource structure may generally be associated to the same transmitting UE. It may be generally considered that a combination of the PUSCH resource structure and the PUCCH resource structure (or structures) form a rectangle in time-frequency space. In general, the PUSCH time interval may be longer than the PUCCH time interval.

The PUCCH resource structure and the PUSCH resource structure may generally be embedded in a scheduled resource structure covering a time interval at least as long as the PUSCH time interval and/or a frequency interval covering the PUSCH frequency interval and the PUCCH frequency interval. The scheduled resource structure may be rectangular. It may be considered that the scheduled resource structure covers, in time domain, a transmission time interval, and/or a slot and/or a plurality of symbol time intervals. Generally, the scheduled resource structure may represent a resource block, which may cover a slot and/or TTI, and/or a plurality of subcarriers, e.g. 12 or more, 20 or more or 50 or more. In some variants, the combination of PUCCH resource structure and the PUCCH resource structure or PUSCH resource structure it is neighbored by in time domain may extend in time (at least) until the end of the scheduled resource structure, respectively the upper or right border of the associated time interval.

A scheduled resource structure may indicate resources scheduled and/or made available for the user equipment (in particular for transmission, but in some cases also for reception, depending on the arrangement of the resource structure and/or the transmission mode) on one or more different channels, in particular PUCCH and PUSCH. The time interval associated to the scheduled resource structure may in particular cover a TTI, and/or one or more symbol time intervals and/or a slot.

It may be considered that in the scheduled resource structure, there is embedded a Physical Downlink Control CHannel, PDCCH, resource structure and/or a Demodulation Reference Symbol, DM-RS, resource structure. The DM-RS resource structure may be associated to uplink DM-RS signaling.

The PUCCH resource structure may be neighbored in time domain to a DM-RS resource structure. In some variants, the PUCCH resource structure may be neighbored in frequency domain by a first DM-RS resource structure, and be neighbored in time domain by a second DM-RS resource structure. The second DM-RS resource structure may cover the same, or at least the, frequency interval as the PUCCH resource structure, and in particular may be later in time than the PUCCH resource structure, e.g. comprise the next symbol time interval after the last symbol of the PUCCH resource structure.

In some variants, embedded in the scheduled resource structure there may be a second PUCCH resource structure covering a second PUCCH time interval. The second PUCCH resource structure may be shifted in time and/or frequency relative to the PUCCH resource structure.

The second PUCCH time interval may be different in length than the PUCCH time interval, in particular longer than the PUCCH time interval.

Alternatively or additionally, the second PUCCH time interval may overlap with the PUCCH time interval, for example they may be assigned at least on common symbol time interval. It may be considered that in an alternative, the PUCCH resource structure is neighbored in time domain by the second PUCCH resource structure.

In some further development, the PUCCH time interval may extend in time beyond the scheduled resource structure, and/or the time interval associated to the scheduled resource structure. This may be considered to refer to the upper (right) time border of the PUCCH time interval being later (more to the right) than the upper time border of the scheduled resource structure. For example, the PUCCH time interval may extend into a following resource structure, in particular into a following slot.

There is also disclosed a program product comprising instructions causing processing circuitry to perform and/or control any one or any combination of the methods disclosed herein.

Moreover, a carrier medium arrangement carrying and/or storing a program product as disclosed herein is proposed.

In the context of this disclosure, a resource structure may be considered to represent time/frequency resources, which may be contained or comprised in the resource structure. Such resources or resource structures may in particular be represented and/or comprise by one or more time intervals and one or more frequency intervals, and/or be considered to comprise specific resource elements and/or one or more resource blocks.

Transmitting simultaneously on different resource structures may refer to the resource structures covering (at least partly) overlapping time intervals, and/or sharing at least one common symbol time interval.

A frequency interval may be represented by, and/or comprise one or more subcarriers, and a time interval may be represented by, and/or comprise, one or more symbol time intervals. The symbol time interval may be defined by the length of one transmission symbol, e.g. according to OFDM or DFTS-OFDM technology used for transmitting the symbol.

A resource structure defined by one time interval and one frequency interval may be considered to be represented by a rectangle in time-frequency domain. A resource structure may comprise sub-structures, which may be associated to specific channels or signaling. A PUCCH resource structure may be implemented as rectangle. In some variants, the PUSCH resource structure may be implemented as rectangle. In other cases, e.g. if the PUCCH resource structure is neighbored by the PUSCH resource structure in both time domain and frequency domain, the PUSCH resource structure may be not rectangular. However, it may be represented by several rectangles neighbored to each other in time and/or frequency domain.

Generally, the PUSCH resource structure and/or PUCCH resource structure may be without holes, in particular in the topological sense (note that the actual signaling on the respective resource structure may comprise empty symbols or breaks). However, in some variants the PUSCH resource structure (and/or the PUCCH resource structure) may be disjoint and/or cover more than one non-overlapping time intervals, which are non-neighbored to each other, and/or more than one non-overlapping frequency intervals, which are non-neighbored to each other (non-neighbored to each other may be considered to refer to for each interval there being at least one interval it is not neighbored to in the respective domain). It may be considered that a scheduled resource structure is implemented as a rectangle in time-frequency space, e.g. representing one or more resource blocks.

A time interval may have two borders in time domain, which may enclose the time space between them. The time interval may be represented and/or comprise one or more symbol time lengths. A resource structure may be considered to cover a time interval if it has resources, e.g. one or more resource elements, assigned to it within the time interval, which in particular may be continuously filling the time interval between the time domain borders of the time interval. Analogously, a frequency interval may have two borders in frequency domain, which may enclose the frequency space between them. The frequency interval may be represented and/or comprise one or more subcarriers (it should be noted that to a subcarrier there may be assigned a subcarrier bandwidth, representing a subcarrier frequency interval). A resource structure may be considered to cover a frequency interval if it has resources, e.g. one or more resource elements, assigned to it within the frequency interval, which in particular may be continuously filling the frequency interval between the frequency domain borders of the frequency interval.

The length of an interval may be considered to be defined by the difference between its upper border and lower border, and pertains to the duration of the interval, not its location in time or frequency domain.

A resource structure may be considered to be neighbored in frequency domain by another resource structure, if they share a common border frequency, e.g. one as an upper frequency border and the other as a lower frequency border. Such a border may for example be represented by the upper end of a bandwidth assigned to a subcarrier n, which also represents the lower end of a bandwidth assigned to a subcarrier n+1.

A resource structure may be considered to be neighbored in time domain by another resource structure, if they share a common border time, e.g. one as an upper (or right in the figures) border and the other as a lower (or left in the figures) border. Such a border may for example be represented by the end of the symbol time interval assigned to a symbol n, which also represents the beginning of a symbol time interval assigned to a symbol n+1.

Generally, a resource structured being neighbored by another resource structure in a domain may also be referred to as abutting and/or bordering the other resource structure in the domain.

Signaling on a resource structure associated to a specific channel may be considered to comprise and/or pertain to signals and/or symbols of the specific channel. For example, signaling on a PUCCH resource structure may comprise and/or pertain to signaling of and/or associated to PUCCH, whereas signaling on a PUSCH resource structure may comprise and/or pertain to signaling of and/or associated to PUCCH. Thus signaling on PUCCH or a related resource structure is different from signaling on a PUSCH.

PUCCH and PUSCH may be implemented as defined according to a 3GPP standard, in particular according to LTE or NR, as amended as suggested herein.

It should be noted that PUCCH and PUSCH may be separately power-controlled, e.g. based on DCI received from a network node.

A PUCCH may be a physical channel for transmitting uplink control signaling, e.g. UCI and/or HARQ signaling and/or measurement reports and/or scheduling requests. A PUSCH may be a physical channel carrying data.

A radio node may generally be considered a device or node adapted for wireless and/or radio (and/or microwave) frequency communication, and/or for communication utilising an air interface, e.g. according to a communication standard.

A radio node may be a network node or a user equipment or terminal. A network node may be any radio node of a wireless communication network, e.g. a base station and/or gNodeB (gNB) and/or relay node and/or micro/nano/pico/ femto node and/or other node, in particular for a RAN as described herein.

The terms user equipment (UE) and terminal may be considered to be interchangeable in the context of this disclosure. A user equipment or terminal may represent and end device for communication utilising the wireless communication network, and/or be implemented as a user equipment according to a standard. Examples of user equipments may comprise a phone like a smartphone, a personal communication device, a mobile phone or terminal, a computer, in particular laptop, a sensor or machine with radio capability (and/or adapted for the air interface), in particular for MTC (Machine-Type-Communication, sometimes also referred to M2M, Machine-To-Machine), or a vehicle adapted for wireless communication. A user equipment may be mobile or stationary.

A radio node may generally comprise processing circuitry and/or radio circuitry. Circuitry may comprise integrated circuitry. Processing circuitry may comprise one or more processors and/or controllers (e.g., microcontrollers), and/or ASICs (Application Specific Integrated Circuitry) and/or FPGAs (Field Programmable Gate Array), or similar. It may be considered that processing circuitry comprises, and/or is (operatively) connected or connectable to one or more memories or memory arrangements. A memory arrangement may comprise one or more memories. A memory may be adapted to store digital information. Examples for memories comprise volatile and non-volatile memory, and/or Random Access Memory (RAM), and/or Read-Only-Memory (ROM), and/or magnetic and/or optical memory, and/or flash memory, and/or harddisk memory, and/or EPROM or EEPROM (Erasable Programmable ROM or Electrically Erasable Programmable ROM). Radio circuitry may comprise one or more transmitters and/or receivers and/or transceivers (which may operate as transmitter and receiver), and/or may comprise one or more amplifiers and/or oscillators and/or filters, and/or may comprise, and/or be connected or connectable to antenna circuitry and/or one or more antennas.

Any one or all of the modules disclosed herein may be implemented in software and/or firmware and/or hardware. Different modules may be associated to different components of a radio node, e.g. different circuitries or different parts of a circuitry. It may be considered that a module is distributed over different components.

A radio access network may be a wireless communication network, and/or a Radio Access Network (RAN) in particular according to a communication standard. A communication standard may in particular a standard according to 3GPP and/or 5G, e.g. according to NR or LTE, in particular LTE Evolution.

BRIEF DESCRIPTION OF THE DRAWINGS

The drawings are provided to illustrate concepts and approaches described herein, and are not intended to limit their scope. References to a resource structure being moved indicate a comparison of the common setup for PUCCH resource structures at the band edges (the band representing, e.g. the frequency interval of the scheduled resource structure). The drawings comprise.

DETAILED DESCRIPTION

In the following, for easier reading, it is referred to PUCCH instead of PUCCH resource structure, and to PUSCH instead of PUSCH resource structure.

Instead of moving PUCCH close to PUSCH it is proposed to move PUCCH inside the scheduled PUSCH resource, respectively to be neighbored by the PUSCH in both time domain and frequency domain. The scheduler/network node is aware when to expect PUCCH transmitted simultaneously with PUSCH and can schedule a resource that accommodates PUSCH and PUCCH. It should be noted that the UE may transmit accordingly based on determining that PUCCH and PUSCH are to be transmitted on simultaneously, such that the network node does not need to configure such channel resource structure arrangement within a scheduled resource structure.

Figure 1:
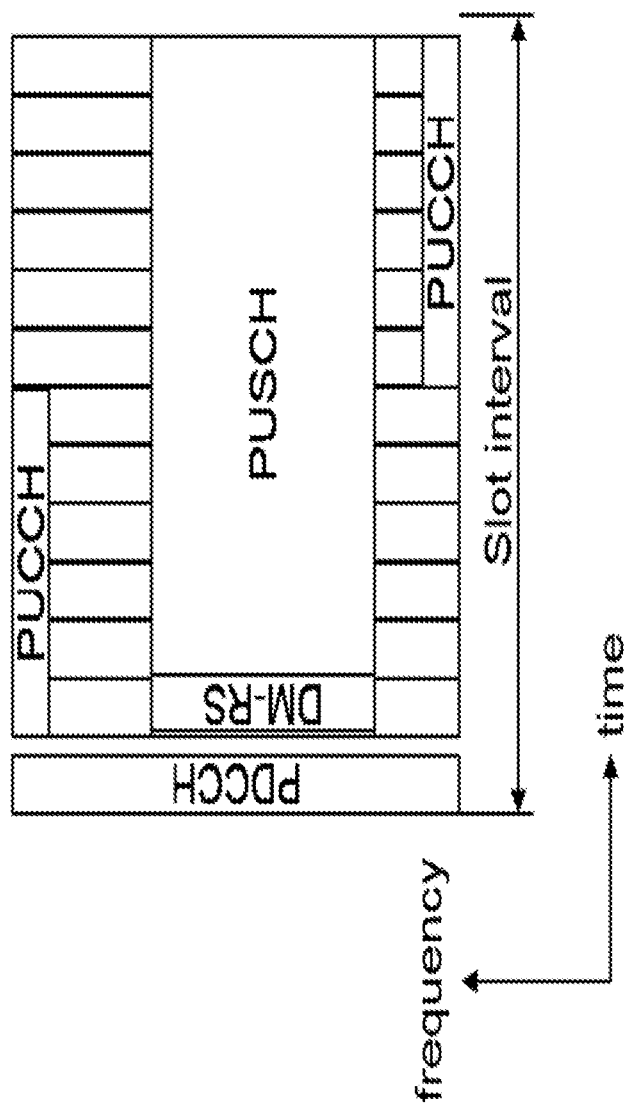
FIG. 1, showing a schematic diagram of simultaneous transmission on PUSCH and PUCCH resource structures.
Figure 2:
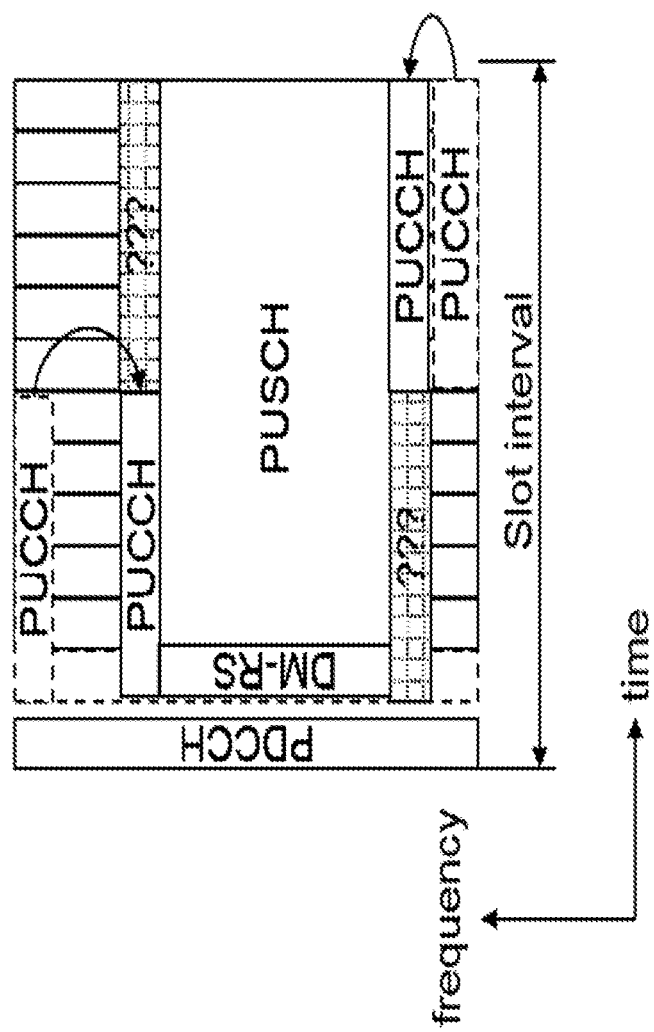
FIG. 2, showing a PUCCH resource structure moved adjacent to a scheduled PUSCH resource structure.

The shape of PUSCH+PUCCH is rectangular again and the problem of the "???" marked resource in FIG. 2 does not exist.

Reduced intermodulation products leading to lower required power backoff. The combined used resourced of PUSCH and PUCCH are rectangular in time-frequency space, which makes it easy to schedule neighboring resources.

To avoid intermodulation products that occur if two or more—disjoint in frequency—signals are sent over a non-linear device such (e.g. power amplifier) it is proposed to move PUCCH into scheduled PUSCH resource, such that the PUSCH resource structure PUSCH signaling is transmitted on is reduced.

In the simplest case, PUCCH is just moved in frequency, as indicated in FIG. 2 (the dashed PUCCH resource is not used by the terminal). PUCCH of course consumes resources and fewer resources are left for PUSCH, however, the gNB knows when to expect simultaneous PUSCH and PUCCH transmission (and thus PUCCH within PUSCH) and adapt the scheduled PUSCH resource accordingly.

Figure 3:
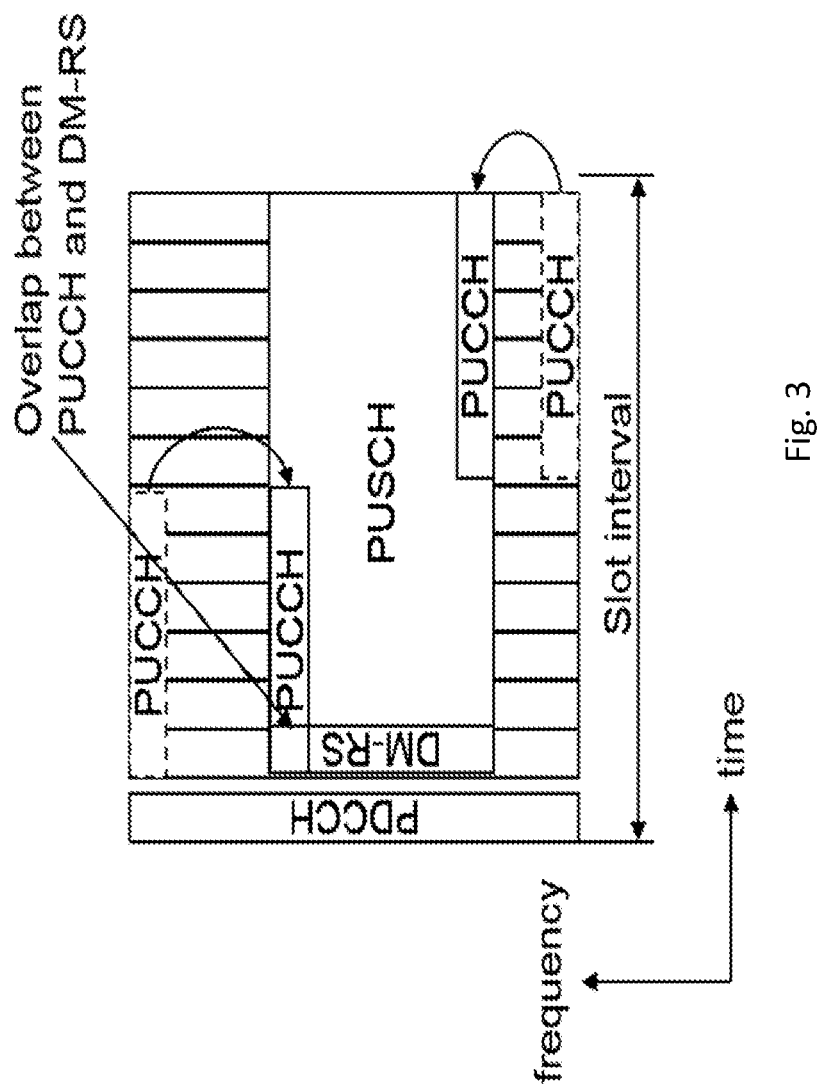
FIG. 3, showing a first proposed variant of arranging a PUCCH resource structure.

In FIG. 3 it can be seen that PUCCH moved into PUSCH may overlap with the DM-RS of PUSCH. Even though the position of PUSCH DM-RS has not been exactly specified yet in 3GPP, a configuration will exist with DM-RS early in the transmission. DM-RS should not be punctured, since in this case no channel estimate would be obtained for this frequency interval.

Even though FIG. 3 only shows one DM-RS other configurations with different DM-RS locations and more than one DM-RS will be defined. The same problem can thus occur at different symbols or even for multiple symbols. In this case, the overlapping part of the DM-RS resource structure may be moved to the right, e.g. to be neighbored by the PUCCH resource structure and be transmitted later (not shown).

Figure 4:
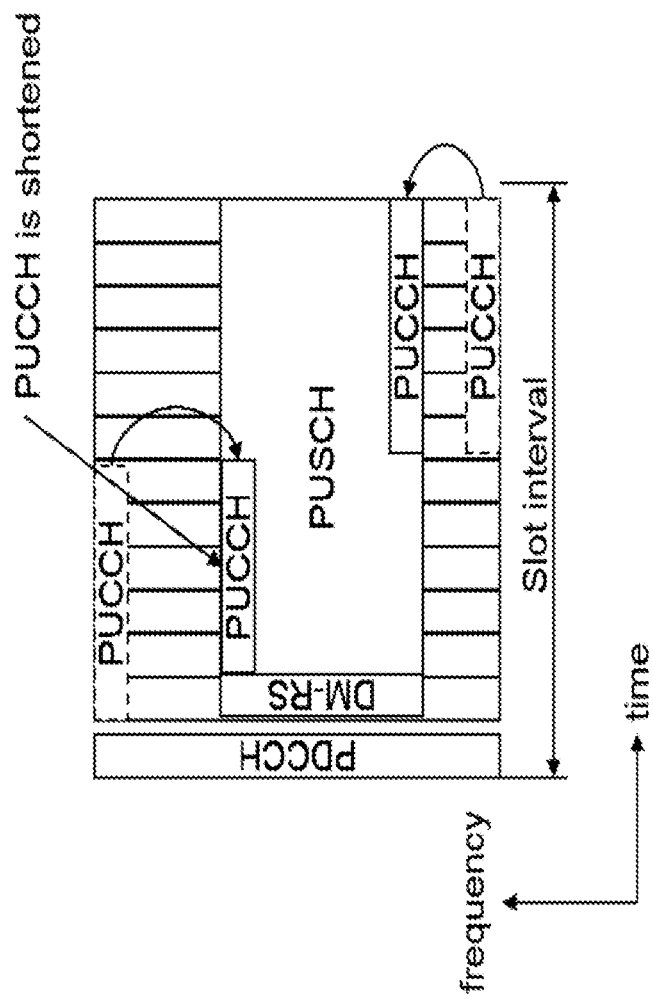
FIG. 4, showing a second proposed variant of arranging a PUCCH resource structure.

Alternatively, the PUCCH may be shortened in time, as shown in FIG. 4 (the dashed PUCCH resource is not used by the terminal). NR PUCCH may support variable PUCCH length, since the number of UL symbols available for PUCCH may vary, e.g. due to longer PDCCH control channel region. FIG. 4 only shows the case for one DM-RS, in case DM-RS are transmitted in multiple symbols PUCCH may be shorten more, and would only be transmitted on symbols without DM-RS. Shortening could be reducing it from the ends or removing symbols from the middle.

FIG. 4 shows how PUCCH is moved into PUSCH and shortened to avoid collision with DM-RS.

Figure 5:
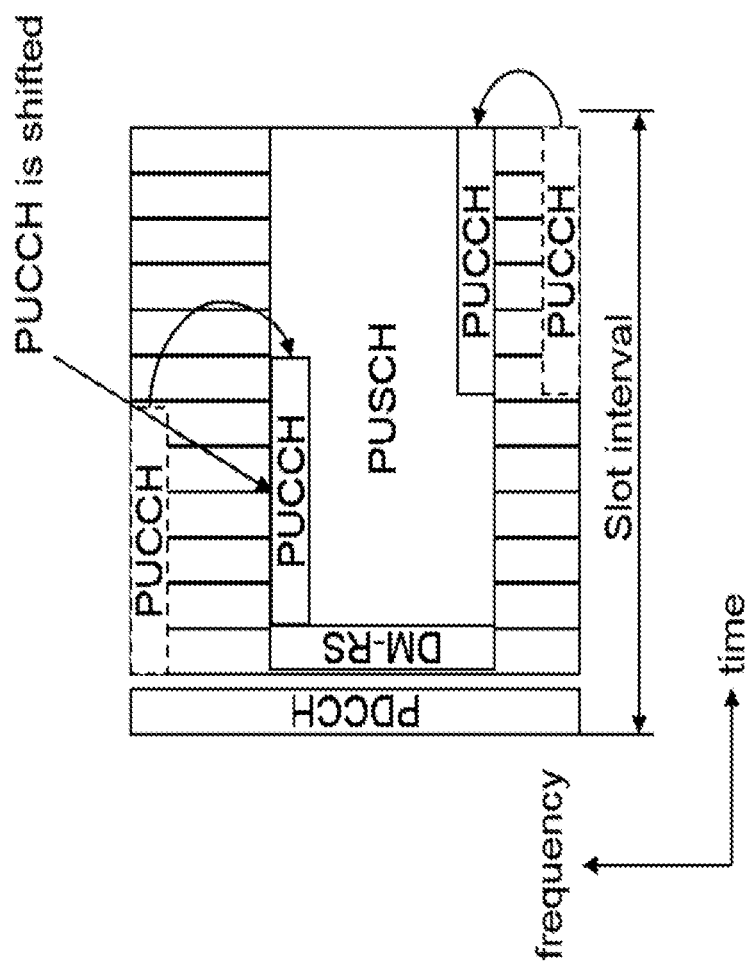
FIG. 5, showing a third proposed variant of arranging a PUCCH resource structure.

Another solution is to shift PUCCH so that it does not overlap the DM-RS, see FIG. 5 (the dashed PUCCH resource is not used by the terminal). This leads to partly parallel transmissions of both PUCCH legs which can potentially lead to power problems (if PUCCH is supposed to be transmitted with high power) and resource problems if the scheduled PUSCH resource is very narrow. FIG. 5 only shows the case for one DM-RS, in case DM-RS are transmitted in multiple symbols PUCCH would be split in time and only transmitted on symbols without DM-RS.

FIG. 5 shows how PUCCH is moved into PUSCH and shifted to avoid collision with DM-RS.

Figure 6:
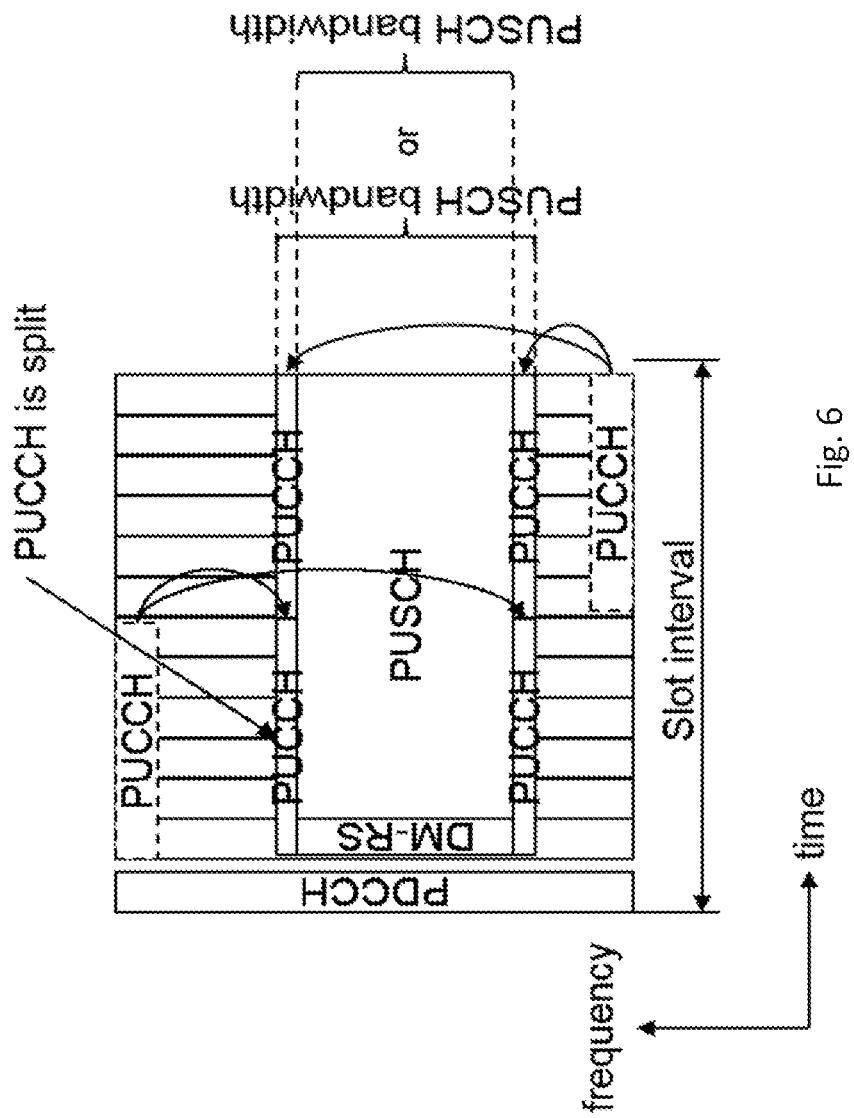
FIG. 6, showing a fourth proposed variant of arranging a PUCCH resource structure.

Yet another possibility is to split PUCCH in frequency-domain as shown in FIG. 6 (the dashed PUCCH resource is not used by the terminal). The upper PUCCH leg is transmitted partly at the upper PUSCH edge (upper frequency border) and partly at the lower PUSCH edge (lower frequency border). The same is also down for the lower PUCCH leg. (Alternatively the upper PUCCH leg is split and the first part is transmitted during the first part of the slot at the upper PUSCH edge and the second part at the second slot part at the upper edge. Same for lower PUCCH leg at lower PUSCH edge.) Note that the split does not have to be necessarily be in the middle.

PUCCH transmitted alone will be of low-PAPR waveform to increase coverage. PUCCH design based on DFTS-OFDM or Zadoff-Chu like (low PAPR) sequence modulation are examples how to achieve low PAPR. Splitting PUCCH in frequency-domain and transmitting each part at frequency-separated positions may destroy these nice PAPR properties. However, a simultaneous transmission of PUSCH and PUCCH is no longer a single-carrier transmission (even if both waveforms on their own are single-carrier), and PAPR in no longer of high importance. Furthermore, for coverage limited users, the network would not configure simultaneous transmission of PUSCH and PUCCH.

DM-RS is no longer scheduled and/or transmitted across the complete scheduled bandwidth (in this case, the frequency interval covering the frequency intervals associated to PUCCH and PUSCH), but within the PUSCH bandwidth (before moving PUCCH) minus the frequencies occupied by PUCCH.

FIG. 6 shows PUCCH moved into PUSCH and split into two parts to avoid collision with DM-RS.

In FIG. 6, also another possibility is shown, the split PUCCH could actually be outside the scheduled PUSCH region as well (the scheduled PUSCH bandwidth would be the more narrowband PUSCH bandwidth of the two shown alternatives). In this case PUCCH would not move inside PUSCH but just adjacent to PUSCH (as in prior art) but PUCCH would be split and transmitted adjacent to both sides of PUSCH. Also this solves the problem how to schedule the "???" marked area in FIG. 2. In this case the scheduler would not need to modify the PUSCH bandwidth to accommodate PUCCH (since PUCCH is anyway transmitted outside PUSCH) and also the PUSCH DM-RS would not be modified.

Figure 7:
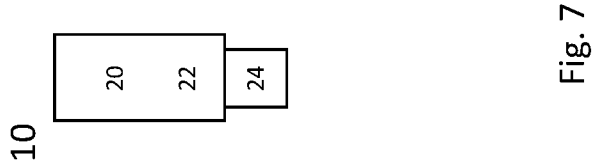
FIG. 7, showing a schematic of an exemplary user equipment.

FIG. 7 schematically shows a terminal 10, which may be implemented as a UE (User Equipment). Terminal 10 comprises processing circuitry (which may also be referred to as control circuitry) 20, which may comprise a controller connected to a memory. Any module of the terminal, e.g. a transmitting module or PUCCH arrangement module, may be implemented in and/or executable by, the processing circuitry 20, in particular as module in the controller. Terminal 10 also comprises radio circuitry 22 providing receiving and transmitting or transceiving functionality (e.g., one or more transmitters and/or receivers and/or transceivers), the radio circuitry 22 being connected or connectable to the control circuitry. An antenna circuitry 24 of the terminal 10 is connected or connectable to the radio circuitry 22 to collect or send and/or amplify signals. Radio circuitry 22 and the processing circuitry 20 controlling it are configured for cellular communication with a network, e.g. a RAN as described herein. Terminal 10 may generally be adapted to carry out any of the methods for operating a terminal or UE disclosed herein; in particular, it may comprise corresponding circuitry, e.g. processing circuitry, and/or modules.

Figure 8:
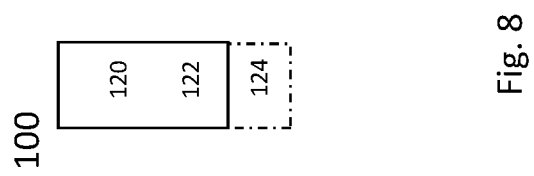
FIG. 8, showing a schematic of an exemplary network node.

FIG. 8 schematically show a network node 100, which in particular may be an eNB, or gNB or similar for NR. network node 100 comprises processing circuitry (which may also be referred to as control circuitry) 120, which may comprise a controller connected to a memory. Any module, e.g. receiving module and/or configuring module of the network node 100 may be implemented in and/or executable by the processing circuitry 120. The processing circuitry 120 is connected to control radio circuitry 122 of the radio node 100, which provides receiver and transmitter and/or transceiver functionality (e.g., comprising one or more transmitters and/or receivers and/or transceivers). An antenna circuitry 124 may be connected or connectable to radio circuitry 122 for signal reception or transmittance and/or amplification. The network node 100 may be adapted to carry out any of the methods for operating a network node disclosed herein; in particular, it may comprise corresponding circuitry, e.g. processing circuitry, and/or modules. The antenna 124 circuitry may be connected to and/or comprise an antenna array. The network node 100, respectively its circuitry, may be adapted to transmit configuration data and/or to configure a terminal as described herein.

Figure 9:
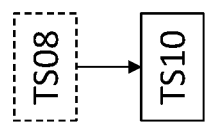
FIG. 9, showing a diagram of an exemplary method for operating a user equipment.

FIG. 9 shows a diagram for an exemplary method for operating a user equipment. The method comprises an action TS10 of transmitting signaling on resource structures as described herein. Optionally, the method may comprise an action TS08, performed before action TS10, of determining that for a scheduled resource structure, transmission on both PUSCH and PUCCH is intended, respectively that simultaneous transmission on PUSCH and PUCCH is intended.

Figure 10:
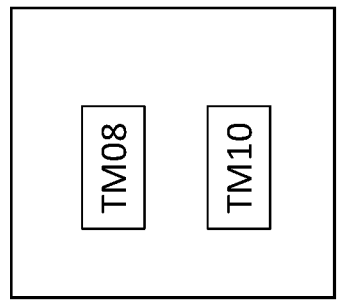
FIG. 10, showing a schematic of another exemplary user equipment.

FIG. 10 shows a schematic of an exemplary user equipment. The user equipment may comprise a transmitting module TM10 for performing action TS10. Optionally, it may comprise a determining module TM08 for performing action TS08.

Figure 11:
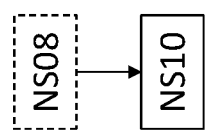
FIG. 11, showing a diagram of an exemplary method for operating a network node.

FIG. 11 shows a diagram for an exemplary method of operating a network node. The method comprises an action NS10 of receiving signaling on resource structures as described herein. Optionally, the method may comprise an action NS08, performed before action NS10, of determining that for a scheduled resource structure, reception on both PUSCH and PUCCH is intended, respectively that simultaneous reception on PUSCH and PUCCH is intended.

Figure 12:
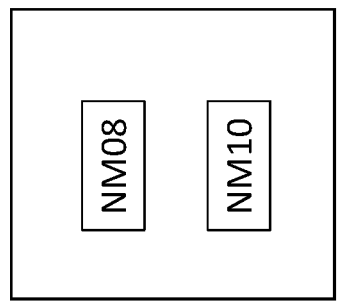
FIG. 12, showing a schematic of another exemplary network node.

FIG. 12 shows a schematic of an exemplary network node. The network node may comprise a receiving module NM10 for performing action NS10. Optionally, it may comprise a determining module NM08 for performing action NS08.

It may be generally considered that for simultaneous transmission of PUSCH and PUCCH, the PUCCH resource structure may be moved into or to the PUSCH region or resource structure. This avoids intermodulation products due to non-contiguous transmissions, and also avoids the problem of non-schedulable resources due to irregular PUSCH+PUCCH resource shape, which may occur if PUCCH is just moved adjacent to PUCCH.

Generally, moving a source resource structure into a target resource structure may be considered to indicate that the target resource structure is partly replaced, not that the moved resource structure now is part of the target resource structure. While variants moving prearranged PUCCH resource structures (e.g., based on a predefined arrangement of resource substructures in a resource structure, which is modified for transmission) are considered, references to moving of resource structures are used to illustrate the construction of the arrangements of resource structures as suggested herein, and should not be considered to indicate that such moving is necessary to determine a resource structure arrangement used for transmitting (or for receiving).

In each physical resource block used for PUCCH, several users may transmit simultaneously. Code multiplexing may be used to keep the signals orthogonal within the same cell.

The term transmission time interval (TTI) may correspond to any time period (T0) over which a physical channel can be encoded and optionally interleaved for transmission. The physical channel may be decoded by the receiver over the same time period (T0) over which it was encoded. Examples of TTI comprise short TTI (sTTI), transmission time, slot, sub-slot, mini-slot, mini-subframe etc. A TTI may comprise a one or more symbol time intervals, and/or one or two slot time intervals, wherein e.g. 7 symbol time intervals may correspond to a slot time interval. Time interval-related terms may be considered to follow 3GPP nomenclature.

There is generally considered a program product comprising instructions adapted for causing processing and/or control circuitry to carry out and/or control any method described herein, in particular when executed on the processing and/or control circuitry. Also, there is considered a carrier medium arrangement carrying and/or storing a program product as described herein.

A carrier medium arrangement may comprise one or more carrier media. Generally, a carrier medium may be accessible and/or readable and/or receivable by control circuitry. Storing data and/or a program product and/or code may be seen as part of carrying data and/or a program product and/or code. A carrier medium generally may comprise a guiding/transporting medium and/or a storage medium. A guiding/transporting medium may be adapted to carry and/or carry and/or store signals, in particular electromagnetic signals and/or electrical signals and/or magnetic signals and/or optical signals. A carrier medium, in particular a guiding/transporting medium, may be adapted to guide such signals to carry them. A carrier medium, in particular a guiding/transporting medium, may comprise the electromagnetic field, e.g. radio waves or microwaves, and/or optically transmissive material, e.g. glass fiber, and/or cable. A storage medium may comprise at least one of a memory, which may be volatile or non-volatile, a buffer, a cache, an optical disc, magnetic memory, flash memory, etc.

A wireless communication network may be and/or comprise a Radio Access Network (RAN), which may be and/or comprise any kind of cellular and/or wireless radio network, which may be connected or connectable to a core network. The approaches described herein are particularly suitable for a 5G network, e.g. LTE Evolution and/or NR (New Radio), respectively successors thereof. A RAN may comprise one or more network nodes. A network node may in particular be a radio node adapted for radio and/or wireless and/or cellular communication with one or more terminals. A terminal may be any device adapted for radio and/or wireless and/or cellular communication with or within a RAN, e.g. a user equipment (UE) or mobile phone or smartphone or computing device or vehicular communication device or device for machine-type-communication (MTC), etc. A terminal may be mobile, or in some cases stationary.

Transmitting in downlink may pertain to transmission from the network or network node to the terminal. Transmitting in uplink may pertain to transmission from the terminal to the network or network node.

Signaling may generally comprise one or more signals and/or one or more symbols. Reference signaling may comprise one or more reference signals or symbols.

A resource element may generally describe the smallest individually usable and/or encodable and/or decodable and/or modulatable and/or demodulatable time-frequency resource, and/or may describe a time-frequency resource covering a symbol time length in time and a subcarrier in frequency. A signal may be allocatable and/or allocated to a resource element. A subcarrier may be a subband of a carrier, e.g. as defined by a standard. A carrier may define a frequency and/or frequency band for transmission and/or reception.

Some useful abbreviations comprise:

| Abbreviation | Explanation |
| --- | --- |
| DCI | Downlink Control Information |
| DFTS-OFDM | Discrete Fourier Transform Spread OFDM |
| DM-RS | Demodulation Reference Signal |
| NR | New Radio, a 3GPP $5^{th}$ generation standard |
| OFDM | Orthogonal Frequency Division Multiplexing |
| PAPR | Peak to Average Power Ratio |
| PDCCH | Physical Downlink Control Channel |
| PUCCH | Physical Uplink Control Channel |
| PUSCH | Physical Uplink Shared Channel |
| UCI | Uplink Control Information |

The invention claimed is:

1. A method for operating a user equipment (UE) in a radio access network (RAN), the method comprising:
   transmitting signaling on a Physical Uplink Control CHannel (PUCCH) resource structure and on a Physical Uplink Shared CHannel (PUSCH) resource structure:
      the PUCCH resource structure covering a PUCCH time interval and a plurality of PUCCH frequency intervals;

the PUSCH resource structure covering a PUSCH time interval and a plurality of PUSCH frequency intervals;

during at least for a part of the PUCCH time interval, the PUCCH resource structure being adjacent to the PUSCH resource structure in the frequency domain along a frequency border between the PUCCH resource structure and the PUSCH resource structure;

for a part of the plurality of PUSCH frequency intervals, the PUCCH resource structure being adjacent to the PUSCH resource structure in the time domain along a time border between the PUCCH resource structure and the PUSCH resource structure; and the PUCCH resource structure being modified to avoid collision with transmission of a demodulation reference signal (DM-RS), the modification including the PUCCH resource structure being split or a combination of split and at least one of shifted and shortened.

2. The method of claim 1, wherein the PUCCH resource structure and the PUSCH resource structure are embedded in a scheduled resource structure covering a time interval at least as long as the PUSCH time interval.

3. The method of claim 2, wherein the scheduled resource structure also includes one or more of the following: a Physical Downlink Control Channel (PDCCH) resource structure and a Demodulation Reference Symbol (DM-RS) resource structure.

4. The method of claim 1, wherein the PUCCH resource structure abuts a DM-RS resource structure in the time domain at a common border time.

5. The method of claim 2, wherein the scheduled resource structure also includes a second PUCCH resource structure covering a second PUCCH time interval.

6. The method of claim 5, wherein the second PUCCH time interval is longer than the PUCCH time interval.

7. The method of claim 5, wherein the second PUCCH time interval overlaps with the PUCCH time interval.

8. The method of claim 2, wherein the PUCCH time interval extends in time beyond the scheduled resource structure.

9. A user equipment (UE) configured for operation in a radio access network (RAN), the user equipment comprising:
transmitter circuitry; and
processing circuitry operably coupled to the transmitter circuitry, whereby the processing circuitry and the transmitter circuitry are configured to:
transmit signaling on a Physical Uplink Control CHannel (PUCCH) resource structure and on a Physical Uplink Shared CHannel (PUSCH) resource structure:
the PUCCH resource structure covering a PUCCH time interval and a plurality of PUCCH frequency intervals;
the PUSCH resource structure covering a PUSCH time interval and a plurality of PUSCH frequency intervals;
during at least for a part of the PUCCH time interval, the PUCCH resource structure being adjacent to the PUSCH resource structure in the frequency domain along a frequency border between the PUCCH resource structure and the PUSCH resource structure;
for a part of the plurality of PUSCH frequency intervals, the PUCCH resource structure being adjacent to the PUSCH resource structure in the time domain along a time border between the PUCCH resource structure and the PUSCH resource structure; and
the PUCCH resource structure being modified to avoid collision with transmission of a demodulation reference signal (DM-RS), the modification including the PUCCH resource structure being split, or a combination of split and at least one of shifted and shortened.

10. A non-transitory, computer-readable medium storing computer-executable instructions that, when executed by processing circuitry of a user equipment (UE), configure the UE to:
transmit signaling on a Physical Uplink Control CHannel (PUCCH) resource structure and on a Physical Uplink Shared CHannel (PUSCH) resource structure:
the PUCCH resource structure covering a PUCCH time interval and a plurality of PUCCH frequency intervals;
the PUSCH resource structure covering a PUSCH time interval and a plurality of PUSCH frequency intervals;
during at least for a part of the PUCCH time interval, the PUCCH resource structure being adjacent to the PUSCH resource structure in the frequency domain along a frequency border between the PUCCH resource structure and the PUSCH resource structure;
for a part of the plurality of PUSCH frequency intervals, the PUCCH resource structure being adjacent to the PUSCH resource structure in the time domain along a time border between the PUCCH resource structure and the PUSCH resource structure; and
the PUCCH resource structure being modified to avoid collision with transmission of a demodulation reference signal (DM-RS), the modification including the PUCCH resource structure being split, or a combination of split and at least one of shifted and shortened.

11. A method for operating a network node in a radio access network (RAN), the method comprising:
receiving signaling on a Physical Uplink Control CHannel (PUCCH) resource structure and on a Physical Uplink Shared CHannel (PUSCH) resource structure:
the PUCCH resource structure covering a PUCCH time interval and a plurality of PUCCH frequency intervals;
the PUSCH resource structure covering a PUSCH time interval and a plurality of PUSCH frequency intervals;
during at least for a part of the PUCCH time interval, the PUCCH resource structure being adjacent to the PUSCH resource structure in the frequency domain along a frequency border between the PUCCH resource structure and the PUSCH resource structure;
for a part of the plurality of PUSCH frequency intervals, the PUCCH resource structure being adjacent to the PUSCH resource structure in the time domain along a time border between the PUCCH resource structure and the PUSCH resource structure; and
the PUCCH resource structure being modified to avoid collision with a demodulation reference signal (DM-RS), the modification including the PUCCH resource structure being split, or a combination of split and at least one of shifted and shortened.

12. The method of claim 11, wherein the PUCCH resource structure and the PUSCH resource structure are embedded in a scheduled resource structure covering a time interval at least as long as the PUSCH time interval.

13. The method of claim 12, wherein the scheduled resource structure also includes one or more of the following: a Physical Downlink Control Channel (PDCCH) resource structure and a Demodulation Reference Symbol (DM-RS) resource structure.

14. The method of claim 11, wherein the PUCCH resource structure abuts a DM-RS resource structure in the time domain at a common border time.

15. The method of claim 12, wherein the scheduled resource structure also includes a second PUCCH resource structure covering a second PUCCH time interval.

16. The method of claim 15, wherein the second PUCCH time interval is longer than the PUCCH time interval.

17. The method of claim 15, wherein the second PUCCH time interval overlaps with the PUCCH time interval.

18. The method of claim 12, wherein the PUCCH time interval extends in time beyond the scheduled resource structure.

19. A network node configured for operation a radio access network (RAN), the network node comprising:
    receiver circuitry; and
    processing circuitry operably coupled to the receiver circuitry, whereby the processing circuitry and the receiver circuitry are configured to:
        receive signaling on a Physical Uplink Control CHannel (PUCCH) resource structure and on a Physical Uplink Shared CHannel (PUSCH) resource structure:
        the PUCCH resource structure covering a PUCCH time interval and a plurality of PUCCH frequency intervals;
        the PUSCH resource structure covering a PUSCH time interval and a plurality of PUSCH frequency intervals;
        during at least for a part of the PUCCH time interval, the PUCCH resource structure being adjacent to the PUSCH resource structure in the frequency domain along a frequency border between the PUCCH resource structure and the PUSCH resource structure;
        for a part of the plurality of PUSCH frequency intervals, the PUCCH resource structure being adjacent to the PUSCH resource structure in the time domain along a time border between the PUCCH resource structure and the PUSCH resource structure; and
        the PUCCH resource structure being modified to avoid collision with a demodulation reference signal (DM-RS), the modification including the PUCCH resource structure being split, or a combination of split and at least one of shifted and shortened.

20. A non-transitory, computer-readable medium storing computer-executable instructions that, when executed by processing circuitry of a network node, configure the network node to:
    receive signaling on a Physical Uplink Control CHannel (PUCCH) resource structure and on a Physical Uplink Shared CHannel (PUSCH) resource structure:
    the PUCCH resource structure covering a PUCCH time interval and a plurality of PUCCH frequency intervals;
    the PUSCH resource structure covering a PUSCH time interval and a plurality of PUSCH frequency intervals;
    during at least for a part of the PUCCH time interval, the PUCCH resource structure being adjacent to the PUSCH resource structure in the frequency domain along a frequency border between the PUCCH resource structure and the PUSCH resource structure;
    for a part of the plurality of PUSCH frequency intervals, the PUCCH resource structure being adjacent to the PUSCH resource structure in the time domain along a time border between the PUCCH resource structure and the PUSCH resource structure; and
    the PUCCH resource structure being modified to avoid collision with a demodulation reference signal (DM-RS), the modification including the PUCCH resource structure being split, or a combination of split and at least one of shifted and shortened.

* * * * *